INVENTOR
Collins M. Crowther
BY
ATTORNEY

March 3, 1959

C. M. CROWTHER 2,875,471

ROTARY MOLDING MACHINE

Filed Sept. 11, 1953

INVENTOR
Collins M. Crowther

BY J. Wesley Everett
ATTORNEY

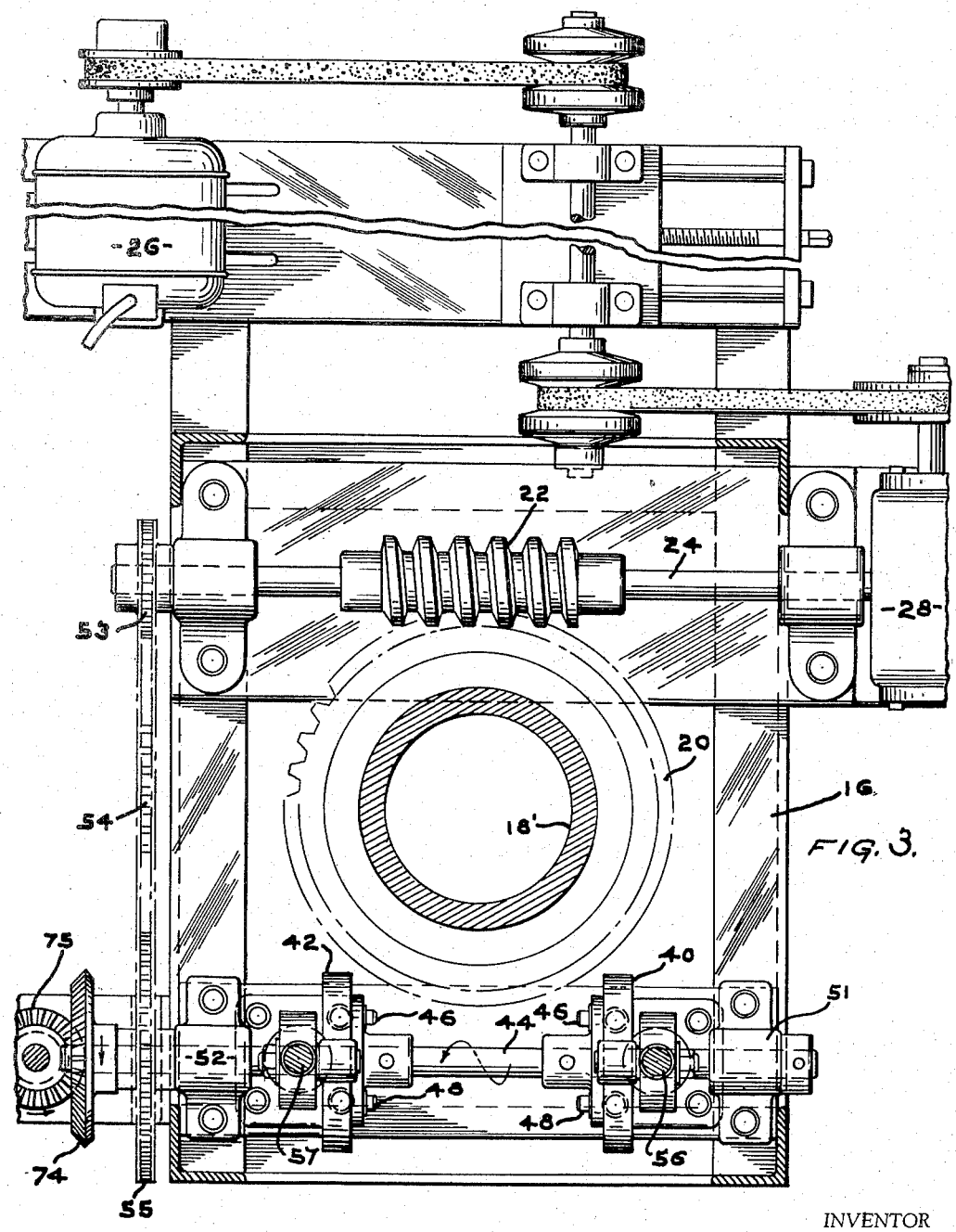

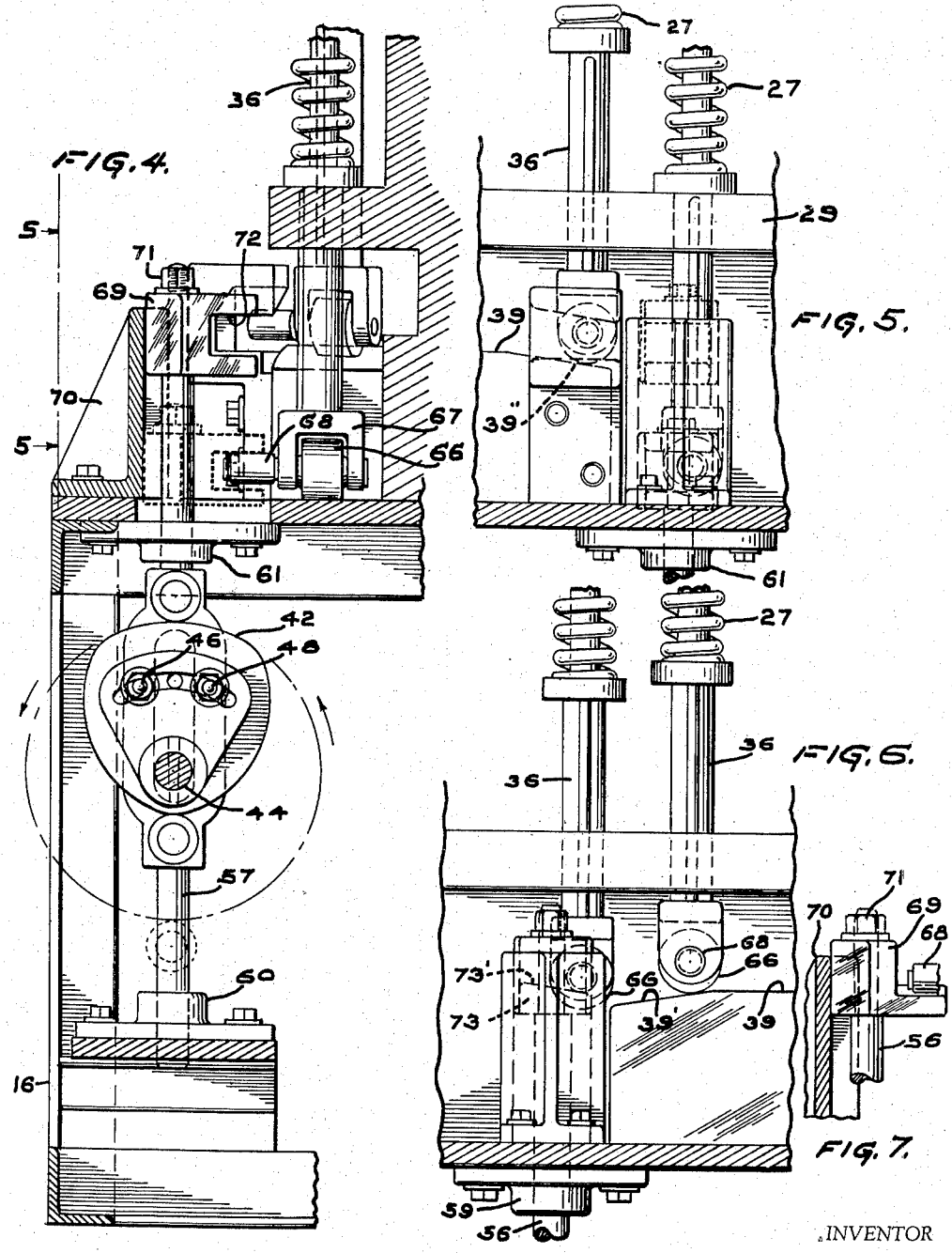

March 3, 1959
C. M. CROWTHER
2,875,471
ROTARY MOLDING MACHINE
Filed Sept. 11, 1953
6 Sheets-Sheet 5
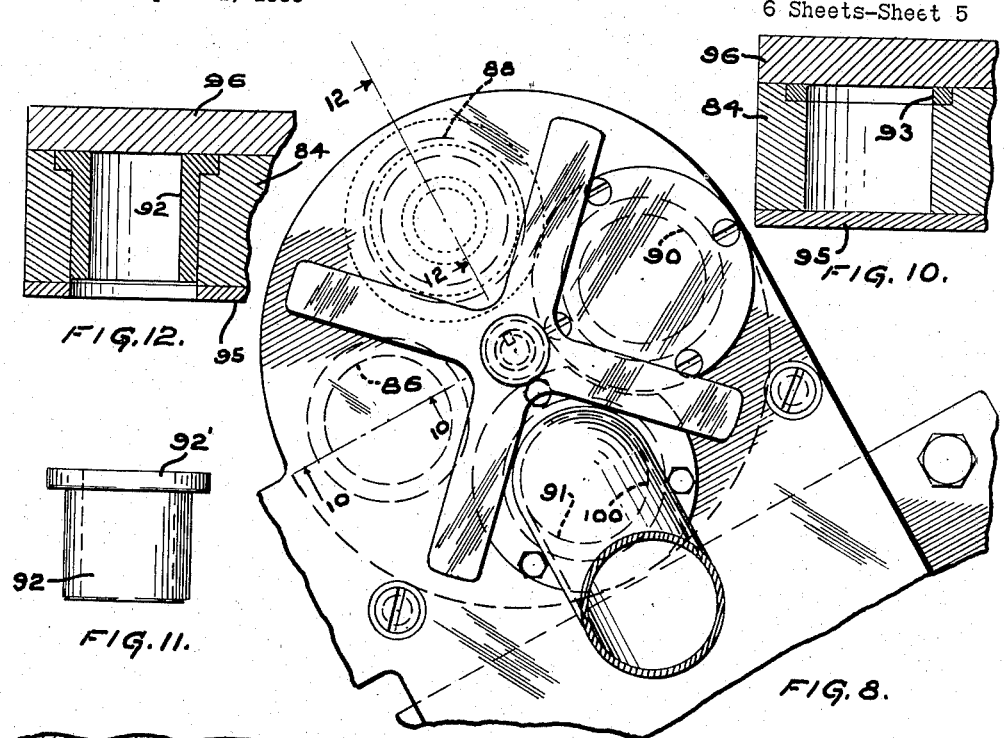
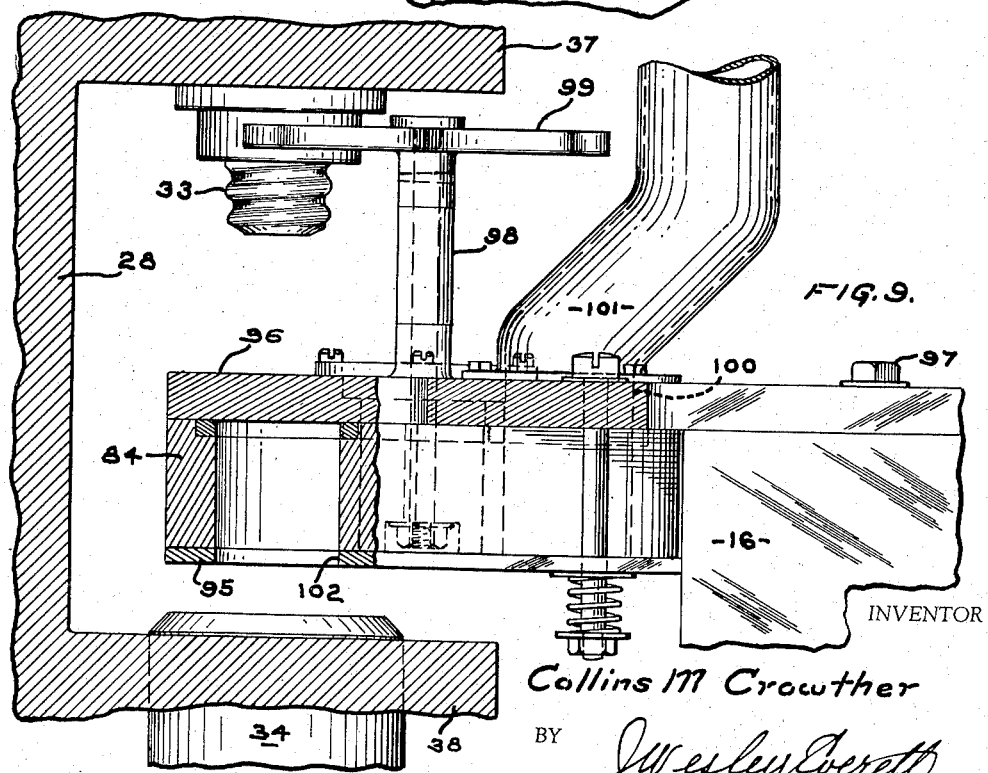
INVENTOR
Collins M. Crowther
BY
J. Wesley Everett
ATTORNEY

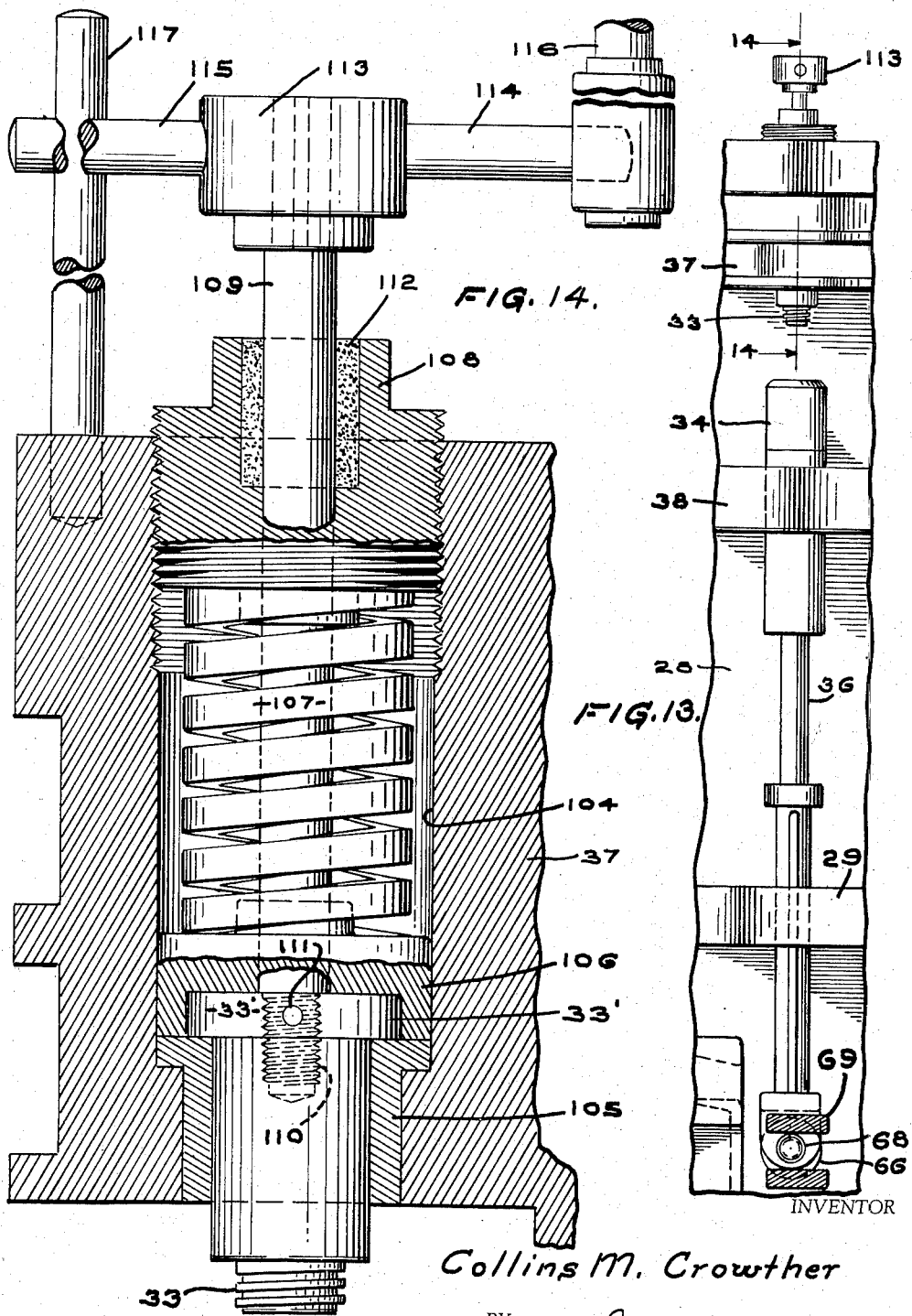

United States Patent Office 2,875,471
Patented Mar. 3, 1959

2,875,471

ROTARY MOLDING MACHINE

Collins M. Crowther, Baltimore County, Md.

Application September 11, 1953, Serial No. 379,700

4 Claims. (Cl. 18—20)

The present invention relates to improvements in rotary molding machines for molding articles from plastic compositions.

In this type molding machine, the molds are usually arranged in a vertical position about the outside of a circular turret or drum. The upper or male complement of the mold is normally carried on a stationary element, that is, without any substantial vertical motion. The lower part or female complement of the mold is normally carried upon a reciprocating element or unit which moves vertically to cause the mold complements to move in and out of contact with each other for molding the articles after a predetermined quantity of material has been deposited within the reciprocating or female portion of the mold and removing the article from the mold prior to the time it is in location to receive a new charge of material. It is with these features of the machine that the present invention relates.

One object of the invention is to provide an improved operating means and method for closing and opening the molds.

Another object of the invention is to provide a direct mechanical driving means leading from the drum itself, or from the drum driving means for rotating the shaft for closing and opening the molds.

Still another object of the invention is to provide an improved means for resiliently supporting the stationary or male member of the die.

A further object of the invention is to provide a simple and improved feeding mechanism.

These and other objects, uses and advantages will be more apparent as the nature of the invention is more fully disclosed, which consists in its novel construction, combination and arrangement of parts as illustrated in the accompanying drawings and described in the following detailed description, in which:

Figure 3 is a sectional plan view taken on the line 3—3 of Figure 1.

Figure 4 is an enlarged fragmentary sectional view in elevation taken on the line 4—4 of Figure 1.

Figure 5 is a view in elevation taken along line 5—5 of Figure 4 showing two reciprocating elements, one in its upper position and one in its downward position.

Figure 6 is an enlarged fragmentary view similar to Figure 5 partly in elevation and partly in section showing the reciprocating elements in different positions.

Figure 7 is a vertical sectional view of one of the upper guide members for the means for operating the reciprocating member.

Figure 8 is an enlarged plan view of the feeding mechanism.

Figure 9 is an enlarged vertical view of the material feeding means partly in elevation and partly in section.

Figure 10 is an enlarged sectional view taken along line 10—10 of Figure 8 showing a normal material feeding opening in the feeding means.

Figure 11 is a view in elevation of a form of bushing used to reduce the normal opening in the feeding means.

Figure 12 is a sectional view taken along line 12—12 of Figure 8 illustrating the bushing shown in Figure 11.

Figure 13 is a fragmentary elevational view of the upper part of a molding machine turret in which the resilient elements for the mold complements are carried in the stationary member.

Figure 14 is an enlarged fragmentary sectional view taken along line 14—14 of Figure 13.

In referring to the drawings, like and similar character references will be used to designate the same parts throughout the several views.

Figure 1:
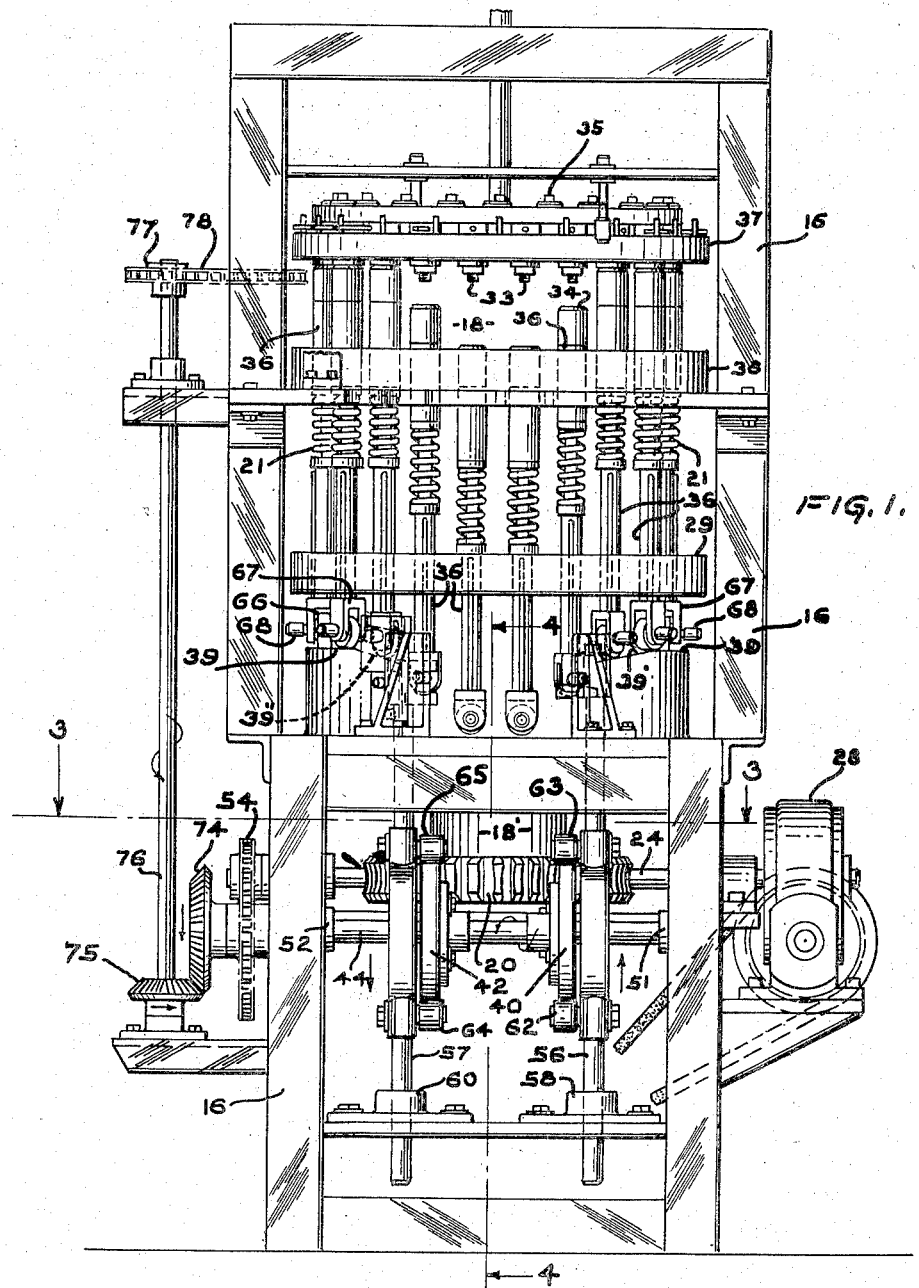
Figure 1 is a view in front elevation of the machine.

The machine is provided with a stationary frame 16 upon which is mounted a rotatable turret or master mold supporting member 18. The lower end 18' of the turret is mounted in a suitable bearing carried on the lower portion of the frame. The bearing is so arranged as to support the turret in a rotatable vertical position. Secured to the bottom extension 18' of the turret is a ring gear 20. Engaging the ring gear is a worm 22 fixedly secured to a shaft 24 which in turn is operated by a motor 26 through a reduction gear carried in the casing 28. This type drive is adapted to rotate the turret at a relatively slow speed. The upper portion of the turret is hollow and open at the upper end, as shown at 18". Within this hollow upper end are a plurality of electrical heating units (not shown) which keep the turret at a predetermined temperature. These heating units are supplied with electrical current through the lead-in wires 30.

Figure 2:
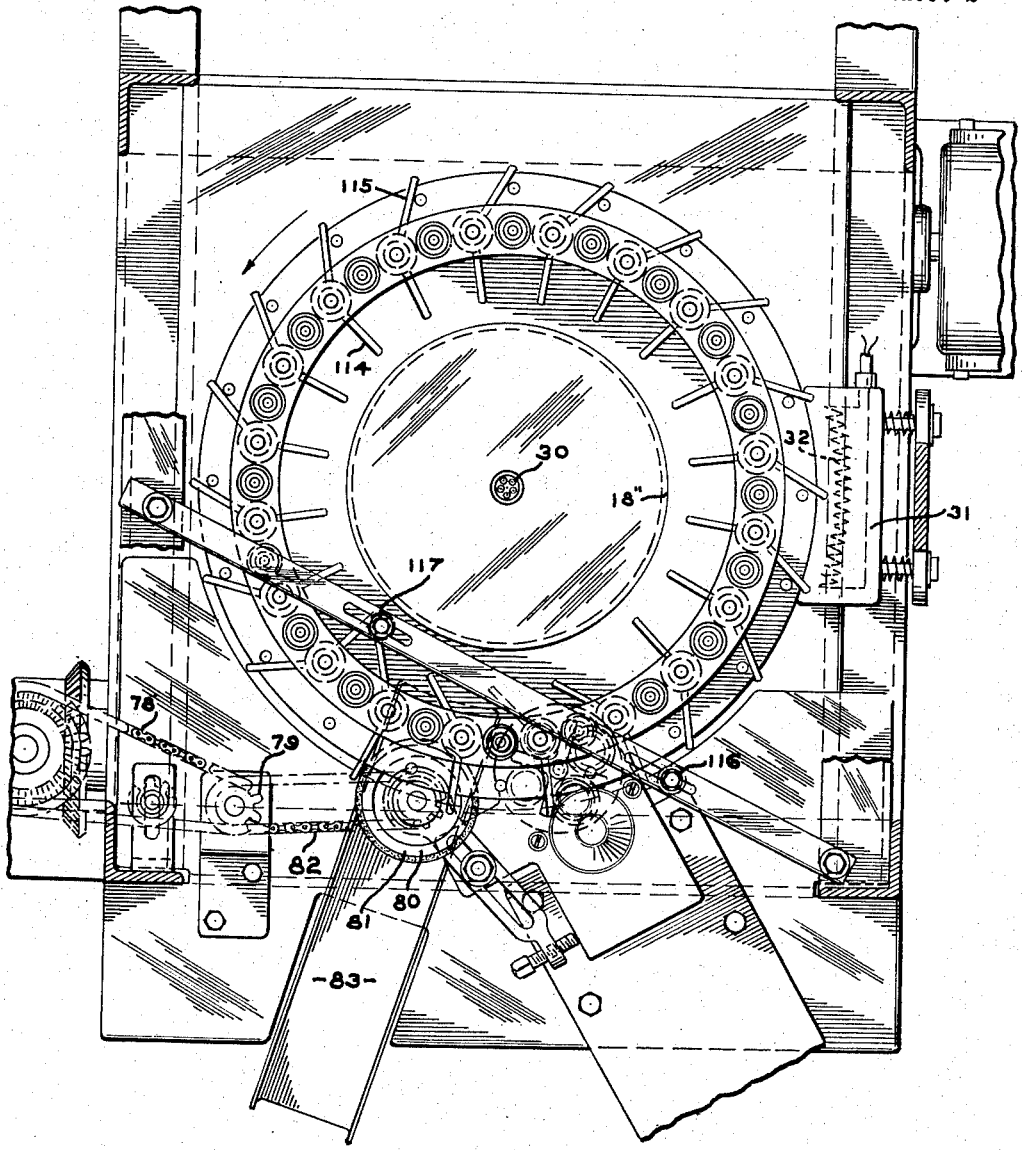
Figure 2 is a plan view of the same.

There is also an additional heating means on the outside of the turret, which is mounted to the frame as shown in Figure 2. This heating element is in the form of a shoe 31 containing a heating element 32 and is so located on the frame as to apply the additional heat to the outside of the turret as the shoe slides along a smooth circular surface provided therefor at a point where the material must be in a complete molten state.

Extending about the outer periphery of the turret, or the master mold carrier, are means for mounting a plurality of individual mold supports, or elements. A mold is normally made up of two complements as indicated by the numerals 33 and 34. Each mold support consists of a stationary element 35 and a reciprocating element 36 which are in vertical alignment. Each element is adapted to receive one of the mold complements. The means for carrying these mold supports consists of external rings 29, 37 and 38 preferably formed integral with the turret. The top ring 37 is adapted to hold the stationary element and rings 29 and 38 are provided with apertures adapted to slidably receive the reciprocating element. The complement carried by the upper stationary element is normally the male portion of the mold, and the complement carried in the reciprocating element is normally the female portion of the mold.

In each revolution of the turret and within a relatively short distance of the travel of the turret, the reciprocating elements are moved up and down to close and open the mold complements for receiving the molding material and extracting the molded article.

The material from which the article is molded is of granulated thermostatic plastic resin which is deposited into the female mold when the reciprocating elements are in a downward position. The mold is then closed by moving the reciprocating element upwardly where it is retained for the molding period. After the mold is closed the molding material is melted by the heat in the turret and the auxiliary heating shoe 31 which is in sliding contact with the ring 38 of the turret. The mold remains closed for approximately 80 percent of the time it takes the turret to make a complete revolution after which the reciprocating elements are moved downwardly to separate the mold complements. By this time the article has been formed and is in a relatively solid state. The article is then removed from the upper complement and as the molds are moved further along their circular path they again receive a new supply of molding material and the operation is repeated.

The machine is particularly adapted to the manufacture of bottle closures and the like and is sometime referred to as a cap molding machine. However, the machine is not limited to this particular use.

As mentioned hereinbefore, the mold complements are moved in closed position by the reciprocating elements, and the holding is accomplished by a track segment 39, the major portion of which is in a horizontal plane perpendicular to the rotating axis of the turret and having a short grade 39' and 39" at each end thereof. Between the ends of the horizontal segments there is provided means for moving the reciprocating elements downwardly separating the mold complements after which the molded article is removed. The reciprocating element travels along its curved path in its downward position to the opposite end 39' of the track segment where it is lifted to a position to close the mold complements.

For operating these individual mold supports there is provided a pair of cams 40 and 42. These cams are carried upon a shaft 44 adjacent each end of the track segment and are normally fixed in position on the shaft but may be provided with any of the well-known adjusting means such as the studs 46 and 48 and the slot 50 carried by the cam as shown best in Figure 4. Shaft 44 is rotatably supported by the bearings 51 and 52. The shaft 44 is driven by a sprocket 53 attached to the shaft 24 by a chain 54 which in turn engages a sprocket 55 carried by the shaft 44. Positioned adjacent the cams 40 and 42 are a pair of slidable vertical reciprocating shafts 56 and 57 which are adapted to slide in bearings 58, 59, 60 and 61 carried by the frame. The cam 42 and shaft 57 are located adjacent the trailing end of the track segment for moving the reciprocating elements downwardly as shown best in Figures 1 and 4, and the cam 40 and shaft 56 are positioned adjacent the approaching end of the track segment to move the reciprocating element upwardly to close the mold complements. The cams are of such speed and so synchronized as to move the reciprocating element at the proper speed and at the proper time.

In order to move the shaft 56 there is attached thereto a pair of spaced rollers 62 and 63 which engage the face of the cam 40 at points opposite its rotating axis. The same arrangement is also employed to move the sliding shaft 57. Rollers 64 and 65 engage the face of cam 42 in substantially the same manner. It is seen by this arrangement the sliding shafts are positively moved in both directions.

Each of the reciprocating elements is provided with a roller 66 on its lower end which is carried in a U frame 67. This roller is adapted to roll along the upper surface of the track segment 39. Each of the lower ends of the reciprocating elements is also provided with a second roller 68 extending outwardly from its lower side and opposite the U frame 67 which will later be referred to as the slot-engaging roll.

Secured to the upper end of the sliding shaft 57 is a member 69 which is supported by a bracket 70. The member 69 is secured to the shaft 57 by a nut 71 and across its inner face is a slot 72. This slot is so located as to have the slot-engaging roll 68 move into the slot as the turret is rotated. As the roller 67 moves off the trailing end of the track segment and down the incline 39" the roller 68 moves into the slot 72 in the member 69 at which time the quick acting cam 42 moves the sliding shaft 57 downwardly bringing with it the reciprocating element 36. The sliding shaft 56 is also provided with a similar horizontal slotted end member 73 and as the slot-engaging roll 68 enters the slot 73' in member 73, the cam 40 operates the sliding shaft 56 and raises the reciprocating element to a point where the main supporting roller 66 will engage the upper inclined surface 39' of the track segment after which the roller moves to the horizontal portion of the track which will keep the mold complements in closed relationship until the end of the track segment is reached when the operation is repeated.

As previously stated, at the beginning of the track segment there is a slight inclined section 39' and at the end of the segment there is a slight declining section 39". The inclined section 39' is for the purpose of giving a relatively high pressuer to the molding material at the beginning of the travel of the molding operation, and the declined portion 39" is for the purpose of releasing the pressure on the mold complements and to allow for the escape of the accumulated gases just prior to the separating of the mold complements.

By the use of the cams, the molds may be opened and closed quickly giving maximum time in which to remove the molded article and refill the mold with molding material. The operation is positive and there is a minimum of working parts having the advantage of less chance for wear and getting out of adjustment.

For removing the molded articles there is carried on one end of the shaft 44 a gear 74 which engages a gear 75. Gear 75 is secured to a shaft 76 which extends vertically along the frame of the machine to a point normally about the height of the upper end of the turret. On the upper end of the shaft 76 is a sprocket 77 about which a chain 78 is trained to rotate a sprocket 79 which in turn is connected with an article removing wheel 80 by a second chain 82 for removing the article from the upper complement of the mold. The outer periphery of the wheel 80 is provided with a soft spongy rubber substance 81. This rim 81 extends into the path of the article after the female mold complement has been removed. The articles are then dropped to an inclined chute 83 where they travel down the incline to a convenient receptacle.

In order to provide material to the molds there is provided a feeding means comprising a rotary disk 84 in which there are four evenly spaced openings 86, 88, 90 and 91 as shown best in Figure 8. These openings are of such size as to take sufficient material for molding the largest articles of which the machine is capable. However, if a smaller amount of material is required, the openings are provided with bushings 92 for reducing their capacity. The bushings are provided with flanges 92' to position the bushing within the opening and support it in proper position. When a bushing is not required only a ring 93 is used to fill the space, or recess, about the top of the opening which otherwise would be filled by the flange 92' of the bushing. The disk 84 is rotated between upper and lower stationary covers 95 and 96. The feeding means is fixedly secured to the frame 16 of the machine, as shown best in Figure 9 in which the upper cover 96 is secured to the frame 16 by a stud 97. The disk 84 is rotatably mounted between the cover members 95 and 96. The upper cover 95 is provided with an appropriate shaft opening. Fixedly secured to the disk is a shaft 98. The shaft extends upwardly through the opening and above the upper cover 96 and secured to the outer end of the shaft is a star wheel 99. The upper cover is also provided with a material supply opening 100. Over this opening there is fitted one end of a material supply pipe 101. To the outer end of the material supply pipe 101 there is connected a conventional material reservoir. In the lower cover there is provided a single material outlet 102 positioned at a point in the lower cover other than directly below the material opening in the upper cover and in the path of the openings in the disk 84. The opening is also located on the inner side of the cover adjacent the axis of the turret and over the path of the mold complements carried on the reciprocating elements when they are in their downward position. The star wheel is of such size and so located that it will engage the stationary mold 33 as the turret is rotated. The star wheel is also adjusted on the shaft so as to turn the disk to a point in which the opening in the disk 84 will coincide with the opening in the lower cover plate when the lower complements of the mold pass beneath it.

There must be some cushioning effect between the mold complements after they have been filled with the molding material. This can be done by providing a resilient means on the reciprocating member as shown by the springs 21 in Figure 1. This is generally the way it is done, however a modified form of resilient support is shown in Figures 13 and 14.

In this modified form the flange 37 is slightly thicker and is provided with a recess 104 into which is fitted a bearing 105 for receiving the die 33. Over the bearing 105 is a relatively thick retaining washer element 106 having a recessed under side in order to receive an enlarged head portion 33' of the die. Above the washer 106 is a coiled compression spring 107. The aperture 104 is threaded downwardly from the top to a point well below the upper end of the normal height of the spring. Into the threaded area of the aperture is a plug 108 adapted to be screwed down on the upper end of the spring 107 for applying pressure to the inner end of the die and in the direction of its outer end. Extending through the washer and plug is a central opening, through which there is a stem 109. This stem 109 is secured to the inner end of the die by a thread 110 and a pin 111. The opposite end of the stem extends outwardly through the plug including a bushing material 112.

Fixedly secured to the outer end of the stem is a member 113 to which is attached arms 114 and 115. These arms are adapted to contact posts 116 and 117 for slightly rotating the male die member 33 at a point just after the reciprocating members start down the incline 39'' of the track 39, just before the female member is withdrawn, to break the seal between the male portion of the die and the article in order that the spinning wheel 80 may easily remove the article.

This cracking of the male mold by slightly rotating the male member is necessary regardless of whether the resilient means is carried by the reciprocating element or the stationary element.

In operation the turret is first heated to a predetermined temperature, molding material is placed in the reservoir which is fed to the disk 84. The machine is then started. As the turret rotates the star wheel engages the evenly spaced upper molds 33 rotating the disk which deposits a measured quantity of material into the female complements of the molds carried by the reciprocating mold supports. At this point the roller 68 enters the slot 72 of the member 69. The cam rotates to raise the sliding shaft member 56 to a point to place the roll 68 on the inclined portion 39' of the track segment 39. By the continuous rotation of the turret the supporting roller 68 moves up the incline onto the horizontal portion 39 of the track. This inclined portion of the track applies an exceptionally high pressure to the material in the mold as it moves the two mold elements closer together. The combination of the rolls 66 and the track 39 hold the mold complements together at the proper pressures as the molds are moved around the machine by the rotation of the turret. The stationary booster heater shoe 31 supplies an additional amount of heat to either ring 37 or 38 or both, as the case may be, during the first phase of the molding period.

When the end of the track segment is reached, the roller 66 passes down the inclined section 39'' of the track relieving the mold of the high pressure within the mold and allowing the accumulated gases to escape.

The slot-engaging roller 68 moves into the slot 72 of the member 69 connected with the upper end of the sliding shaft 57, and the cam 42 operates to move the reciprocating element to a downward position. When the reciprocating member has moved the lower mold complement out of engagement with the molded article, the article comes in contact with the rotating wheel 80 which removes the article from the upper mold complement. The article then drops into the inclined chute 83 and is conveyed to a suitable receptacle. As the turret continues to rotate, the lower mold complement comes under the opening in the lower cover 65 where it receives another charge of material and the operation is repeated.

While this novel arrangement of the various mechanical elements shown and described herein provide a simple and practical machine of this type, and while a particular embodiment of the invention has been shown and described, it is not intended as a limitation as the scope of the invention is best defined in the appended claims.

I claim:

1. A molding machine having a stationary frame and a rotatable heated mold supporting member mounted thereon and adapted to rotate about a vertical axis, a plurality of evenly spaced mold supporting units arranged about the mold supporting member equidistant from its vertical axis, each mold support having an upper stationary member and a lower reciprocating member, each mold having complemental elements, one of which is carried by the stationary member and the other carried by the reciprocated member, a fixed stationary track segment supported upon the frame below the reciprocating mold supporting element, the major portion of which is in a plane perpendicular with the vertical axis of the mold supporting member for holding the mold complements in closed position for a predetermined distance of the rotary travel of the mold supporting member and a track engaging member carried by the reciprocating members for engaging the upper surface of the track, means for moving the respective reciprocating members downwardly after they have passed the trailing end of the track segment to separate the mold complements, means for removing the mold articles from the mold and a material handling unit for depositing a molding material within the mold carried by the reciprocating members while the mold complements are separated and means adjacent the opposite end of the track segment for moving the reciprocal member upwardly to close the molds, the mold opening and closing means comprising a pair of continuously rotatable cams positioned one at each end of and below the track segment having means associated with one of the said cams for moving the reciprocating member downwardly at the end of the travel of the reciprocating member along the track segment and means associated with the other cam for moving the reciprocating member upwardly at a point adjacent the opposite end of the track segment to a point in which the track engaging member of the reciprocating member will engage the upper surface of the track as the mold supporting member is rotated about the vertical axis of the molding machine.

2. A molding machine having a heated stationary frame and a rotatable mold supporting member mounted thereon and adapted to rotate about a vertical axis, a plurality of evenly spaced mold supporting units arranged about the mold supporting member equidistant from its vertical axis, each mold support having an upper stationary member and a lower reciprocating member, each mold having complemental elements, one of which is carried by the stationary member and the other carried by the reciprocated member, a fixed stationary track segment supported upon the frame, the major portion of which is in a plane perpendicular with the vertical axis of the mold supporting member for holding the mold complements in closed position for a predetermined distance of the rotary travel of the mold supporting member and a track engaging member carried by the reciprocating members for engaging the upper surface of the track for holding the lower complemental elements upward in contact with the upper complemental element, means for moving the successive reciprocating members downwardly after they have passed the trailing end of the track segment to separate the mold complements, means for removing the molded articles from the mold and means for depositing a molding material within the mold carried by the reciprocating member while the mold complements are separated and means for moving the reciprocal member upwardly to close the molds, the mold opening and closing means comprising a pair of continuously rotatable cams positioned one at each end of the track segment having a vertical slidable shaft associated with each cam, means on the upper end of the slidable shafts for engaging the lower ends of the reciprocating elements, the vertical slide shafts having means thereon for contacting opposite points on each side of the respective cams for giving the shafts a positive movement in both directions, the slidable shaft asssociated with the cam adjacent the trailing edge of the track segment being adapted to move the reciprocating element downwardly to separate the mold complements, the slidable shaft associated with the cam adjacent the opposite end of the track segment adapted to move the reciprocating element upwardly to a point in which the track engaging member of the reciprocating member will engage the upper surface of the track as the mold supporting member is rotated thereby finally closing and holding the mold complements in closed position for a predetermined travel of the mold supporting element.

3. A molding machine having a stationary frame and a heating rotatable mold supporting member supported thereon and adapted to rotate about a vertical axis, a plurality of evenly spaced mold supporting elements arranged about the mold supporting member equidistant from its vertical axis, each mold support having a fixed cooperating upper stationary member and a lower reciprocating member, each mold having at least two complemental elements one of which is carried by the stationary members and the other carried by the reciprocating member, each upper stationary mold support having a coiled spring associated therewith for resiliently supporting the upper mold complement, the corresponding mold complement carried by the reciprocating support being fixed to the reciprocating support to reciprocate therewith, a fixed stationary track segment supported upon the frame the major portion of which is in a plane perpendicular with the vertical axis of the mold supporting member, a track engaging member carried by the reciprocating member for engaging the upper surface of the track for holding the mold complement in closed position for a predetermined distance of the rotating travel of the mold supporting member, means for moving the reciprocating member downwardly after it has passed the trailing end of the track segment to separate the mold complements, means for removing the molded articles from the mold and means for depositing material into the mold complement carried by the reciprocating mold support while the complements are separated, means adjacent the opposite end of the track segment for moving the reciprocal member upwardly to close the mold complements, the opening and closing means comprising a pair of continuously rotatable cams positioned one at each end of the track segment adapted to operate a lowering and a raising elevator for the reciprocating mold supports having means associated with the upper ends of the elevator means for engaging the reciprocating members for moving them in their respective directions.

4. In a thermo-plastic molding machine comprising in combination a rotatable mold-carrying body having a plurality of pairs of cooperating stationary and reciprocating mold supporting elements, each pair of stationary and reciprocating mold supporting elements adapted to support separately a mold complement, means for separating, closing and holding the said mold complements in closed position, a roller carried by the lower end of the reciprocating mold support, said means for holding the mold complements in closed position comprising a horizontal track segment adapted to support on its upper surface the rollers carried by the reciprocating mold support, separate means for opening and separate means for closing the said molds each comprising a vertical reciprocal member and a separate horizontally rotatable cam for operating the reciprocal members, means cooperating between the cam and the vertical reciprocal members for operating the reciprocating member, means on one of the reciprocating members for engaging the roller on the reciprocating mold support for moving the mold support downwardly to open the mold and means on the other reciprocating member for engaging the roller on the reciprocating mold support and moving the reciprocating mold support upwardly until the roll thereon is in a position to roll onto the said track segment, means for heating the said molds and means for rotating the mold carrying body about a central vertical axis.

References Cited in the file of this patent
UNITED STATES PATENTS

| | | |
|---|---|---|
| 1,626,860 | Mudd | May 3, 1927 |
| 1,844,700 | Stokes | Feb. 9, 1932 |
| 2,155,316 | Lauterbach | Apr. 18, 1939 |
| 2,440,366 | Cropp | Apr. 27, 1948 |
| 2,445,742 | Hoch | July 20, 1948 |
| 2,513,216 | Sullivan et al. | June 27, 1950 |
| 2,699,574 | Gilbert | Jan. 18, 1955 |